(12) United States Patent
Yang

(10) Patent No.: US 10,033,648 B2
(45) Date of Patent: Jul. 24, 2018

(54) MULTICAST MESSAGE FORWARDING METHOD AND DEVICE

(71) Applicant: ZTE Corporation, Shenzhen, Guangdong (CN)

(72) Inventor: Liu Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 157 days.

(21) Appl. No.: 15/123,728

(22) PCT Filed: Aug. 5, 2014

(86) PCT No.: PCT/CN2014/083724
§ 371 (c)(1),
(2) Date: Sep. 6, 2016

(87) PCT Pub. No.: WO2015/131486
PCT Pub. Date: Sep. 11, 2015

(65) Prior Publication Data
US 2017/0012880 A1    Jan. 12, 2017

(30) Foreign Application Priority Data

Mar. 7, 2014   (CN) .......................... 2014 1 0084417

(51) Int. Cl.
*H04L 12/851* (2013.01)
*H04L 12/64* (2006.01)
(Continued)

(52) U.S. Cl.
CPC .......... *H04L 47/24* (2013.01); *H04L 12/6418* (2013.01); *H04L 45/02* (2013.01); *H04L 45/16* (2013.01)

(58) Field of Classification Search
CPC ..... H04L 12/6418; H04L 45/02; H04L 45/16; H04L 47/24
See application file for complete search history.

(56) References Cited

U.S. PATENT DOCUMENTS

| 2009/0103468 A1* | 4/2009 | Kasapidis | ............. H04L 12/185 370/312 |
| 2014/0003427 A1* | 1/2014 | Nishi | ...................... H04L 45/16 370/390 |
| 2015/0188753 A1* | 7/2015 | Anumala | ................ H04L 45/48 370/225 |

FOREIGN PATENT DOCUMENTS

| CN | 1863147 A | 11/2006 |
| CN | 101123529 A | 2/2008 |

(Continued)

OTHER PUBLICATIONS

International Search Report in international application No. PCT/CN2014/083724, dated Dec. 16, 2014, 5 pgs.
(Continued)

*Primary Examiner* — Mohamed Kamara
(74) *Attorney, Agent, or Firm* — Cooper Legal Group, LLC

(57) ABSTRACT

Provided is a method for forwarding a multicast message, which includes that: a forwarding chip receives a multicast message, determines that the multicast message is a known multicast message, sends the known multicast message to a Central Processing Unit (CPU), deletes a CPU interface from an outbound interface list of a multicast forwarding table, updates the multicast forwarding table and a multicast state table according to a received multicast routing table, and determines that the multicast forwarding table is converged into a steady state according to the updated multicast state table. A device for forwarding a multicast message is provided, accordingly.

15 Claims, 2 Drawing Sheets

(51) Int. Cl.
*H04L 12/751* (2013.01)
*H04L 12/761* (2013.01)

(56) References Cited

FOREIGN PATENT DOCUMENTS

| CN | 101159665 A | 4/2008 |
|---|---|---|
| CN | 102916892 A | 2/2013 |

OTHER PUBLICATIONS

English Translation of the Written Opinion of the International Search Authority in international application No. PCT/CN2014/083724, dated Dec. 16, 2014, 8 pgs.

* cited by examiner

MULTICAST MESSAGE FORWARDING METHOD AND DEVICE

TECHNICAL FIELD

The present disclosure relates to a data forwarding technology in the field of communication, and in particular to a method and device for forwarding a multicast message.

BACKGROUND

Along with rapid development of the Internet, cloud computing and Internet Protocol (IP) multicast, more and more novel multicast application services such as high-definition videos and online live videos have gradually permeated into each field. Forwarding of a multicast data stream can be implemented only when a protocol layer and a forwarding layer work together. In a multicast protocol network driven by multicast data streams, it is usually needed to send a multicast message to a Central Processing Unit (CPU) for processing, but in a practical networking and testing process, users and multicast data streams usually act at the same time in batches. In such a scenario, the multicast message processing efficiency of the CPU is very important, otherwise it may become a bottleneck for forwarding multicast messages. Therefore, it is meaningful to find how to improve multicast data stream processing efficiency of a CPU.

Most of existing methods only solve problems about how to improve the multicast message processing efficiency of a CPU when the CPU is attacked by an unknown multicast source, but failed to consider all possible impact on the CPU when multicast messages are needed to be uploaded. In addition, most of the existing methods employ software for processing, however, processing by software is started only after the CPU receives a multicast data packet, which cannot cut off repeated uploading of multicast data, so that a burden of the CPU is increased, resources of the CPU are wasted, and certain disadvantages are caused which influence the quality of service.

SUMMARY

In order to solve the existing problem, the embodiments of the present disclosure provide a method and device for forwarding a multicast message.

The technical solutions of the embodiments of the present disclosure are implemented as follows.

An embodiment of the present disclosure provides a method for forwarding a multicast message, which may include that:

a forwarding chip receives a multicast message, determines that the multicast message is a known multicast message, then sends the known multicast message to a CPU, deletes a CPU interface from an outbound interface list of the multicast forwarding table, updates a multicast forwarding table and a multicast state table according to a received multicast routing table, and determines that the multicast forwarding table is converged into a steady state according to the updated multicast state table.

An embodiment of the present disclosure further provides a multicast message forwarding device, which may be implemented by a forwarding chip and may include: a receiving module, a determination module, a sending module, a deletion module and an updating module, wherein the receiving module may be configured to receive a multicast message and a multicast routing table;

the determination module may be configured to determine that the multicast message is a known multicast message, and determines that a multicast forwarding table is converged into a steady state according to an updated multicast state table;

the sending module may be configured to send the known multicast message to a CPU;

the deletion module may be configured to delete a CPU interface from an outbound interface list of the multicast forwarding table; and the updating module may be configured to update the multicast forwarding table and the multicast state table according to the received multicast routing table.

According to the multicast message forwarding method and device provided by the embodiments of the present disclosure, a multicast message is received, the multicast message is determined to be a known multicast message, the known multicast message is sent to a CPU, a CPU interface from an outbound interface list of the multicast forwarding table is deleted, a multicast forwarding table and a multicast state table are updated according to the received multicast routing table, and it is determined that the multicast forwarding table is converged into a steady state according to the updated multicast state table. Therefore, the multicast message processing efficiency of the CPU may be fully improved on the premise of protecting the CPU, the transmission routing efficiency of a multicast protocol layer may be further improved, and the multicast message may be timely forwarded.

DETAILED DESCRIPTION

Figure 1:
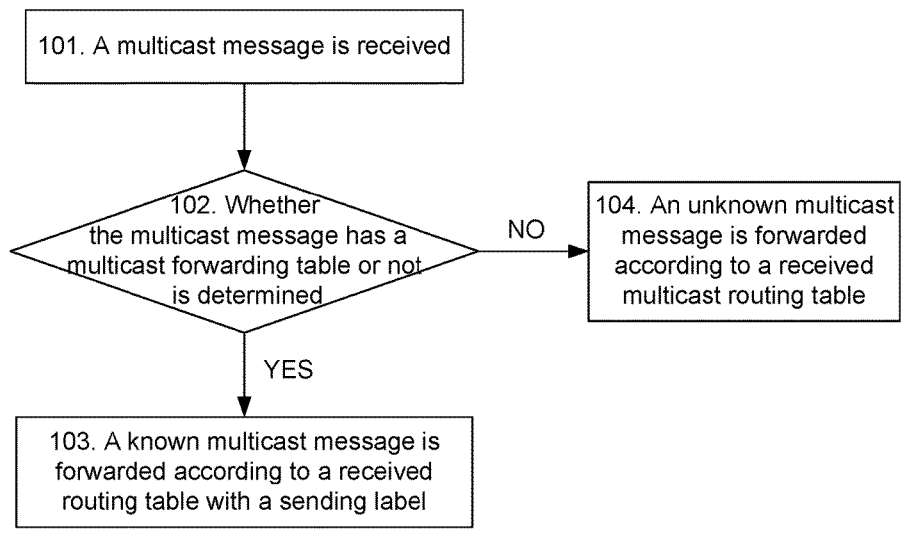
FIG. 1 is a flowchart of a multicast message forwarding method according to existing technologies.

In order to make the technical solutions of the present disclosure better understood, a method for sending a multicast message to a CPU for processing in the existing technologies is introduced in the present disclosure. As shown in FIG. 1, the method mainly includes the following steps.

Step 101: a multicast message is received.

Step 102: whether the multicast message has a multicast forwarding table or not is determined; if it has a multicast forwarding table, step 103 is executed; and if it does not has one, step 104 is executed.

In the step, when receiving the multicast message, a CPU checks whether the multicast message has a multicast forwarding table or not according to a destination multicast address of a multicast data frame.

Step 103: a known multicast message is forwarded according to a received multicast routing table with a sending label, and the flow is ended.

In the step, when it is found that the multicast message has a multicast forwarding table, the multicast message is determined to be a known multicast message. Here, a Protocol Independent Multicast Sparse Mode (PIMSM) driver transmits the multicast routing table, the multicast protocol driver determines whether a route is needed to be appended with the sending label while forwarding the multicast message according to a current multicast protocol state; if needed, the multicast message is forwarded according to the multicast routing table with the sending label. For example, if a current multicast protocol is in a high-speed switching process of a Shortest Path Tree (SPT), the received multicast routing table may contain an NS label, which indicates that the multicast message is needed to be forwarded, the message is also needed to be sent to the CPU and the sending label of the multicast routing table may be deleted after the multicast message is successfully sent.

Step 104: an unknown multicast message is forwarded according to the received multicast routing table, and the flow is ended.

In the step, when the multicast message does not have a multicast forwarding table, the multicast message is determined to be an unknown multicast message. Here, the unknown multicast message is forwarded according to a multicast routing table transmitted by a corresponding multicast protocol driver.

It can be seen that, although a multicast message may be processed and forwarded according to existing technologies, there may usually exist a condition that massive multicast data streams are simultaneously sent and repeatedly sent in a practical networking and testing process, which brings great impact on the CPU and greatly reduces the multicast message processing efficiency of the CPU and a resource utilization rate of the CPU.

In the embodiments of the present disclosure, a forwarding chip receives a multicast message, determines that the multicast message is a known multicast message, sends the known multicast message to a CPU, deletes a CPU interface from an outbound interface list of a multicast forwarding table, updates a multicast forwarding table and a multicast state table according to a received multicast routing table, and determines that the multicast forwarding table is converged into a steady state according to the updated multicast state table to implement a forwarding process.

The technical solutions of the present disclosure will be further described below with reference to the drawings and specific embodiments in detail.

Embodiment 1

Figure 2:
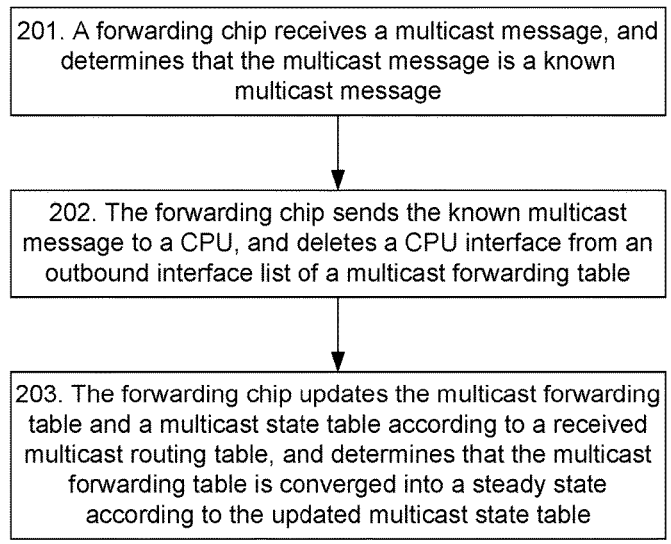
FIG. 2 is a flowchart of a multicast message forwarding method provided by embodiment 1 of the present disclosure.

The embodiment of the present disclosure provides a method for forwarding a multicast message. As shown in FIG. 2, the method mainly includes the following steps.

Step 201: a forwarding chip receives a multicast message, and determines that the multicast message is a known multicast message.

In the step, the forwarding chip checks whether the received multicast message has a multicast forwarding table or not according to information such as a Source IP (SIP) address, a Destination IP (DIP) address and an inbound Virtual Local Area Network (VLAN); when the multicast message has the multicast forwarding table, the multicast message is determined to be the known multicast message; and the step further includes that: when the multicast message has no multicast forwarding table, the multicast message is determined to be an unknown multicast message.

Step 202: the forwarding chip sends the known multicast message to a CPU, and deletes a CPU interface from an outbound interface list of the multicast forwarding table.

In the step, when the known multicast message is needed to be sent to the CPU for processing, the forwarding chip sends the known multicast message to the CPU according to priority of the corresponding multicast forwarding table in a multicast state table, deletes the CPU interface from the outbound interface list of the multicast forwarding table, writes a state field in the multicast state table to be a value representing that the multicast forwarding table is not converged into a steady state and writes a hit mark in the multicast state table to be a value representing that the multicast message is not successfully sent within a sending period; and when the known multicast message is not needed to be sent to the CPU for processing, the forwarding chip normally forwards the known multicast message according to the multicast forwarding table.

Fields in the multicast state table may include: information such as State, priority of a multicast forwarding table, and a Hit mark; specifically, the State includes two states, i.e. 0 and 1, where 0 represents that the multicast forwarding table is converged into the steady state, and 1 represents that the multicast forwarding table is not converged into the steady state; the Priority represents the priority of the multicast forwarding table, and the smaller a value of the Priority is, the higher the priority of the multicast forwarding table is. The Priority is further used to calculate the sending period of the multicast message, wherein sending period=timer period*Priority;

the Hit has two states, i.e. 0 and 1, where 1 represents that the multicast message has been successfully sent within the sending period, and 0 represents that the multicast message is not successfully sent within the sending period; and in the present disclosure, a timer period is set according to a parameter, such as an aging period of the multicast forwarding table and a source registration message period, set in a multicast protocol, and the timer period is set to be 200 ms for a multicast service.

The step further includes that: when the multicast message received by the forwarding chip is the unknown multicast message, multicast information such as a SIP address, a DIP address and an inbound VLAN of the unknown multicast message is analyzed according to a multicast protocol analysis rule, the analyzed multicast information is written into a temporary multicast forwarding table, fields in a temporary multicast state table are written, and the unknown multicast message is sent to the CPU;

here, the CPU may allocate the unknown multicast message to a corresponding multicast protocol driver according to the multicast protocol PIMSM, and the multicast protocol driver analyzes the multicast information of the unknown multicast message according to the multicast protocol analysis rule, calculates a corresponding multicast route according to the analyzed multicast information and transmits a multicast routing table to the forwarding chip and the CPU, wherein the multicast protocol analysis rule includes: information such as the format of multicast data, the length of multicast data, and the name of multicast data.

The fields in the temporary multicast forwarding table include: information such as the SIP address, DIP address and inbound VLAN of the multicast message and NULL; and NULL indicates that the outbound interface list of the multicast forwarding table is null, that is, the forwarding chip is not needed to forward the unknown multicast message to any port.

The fields in the temporary multicast state table match with the fields in the multicast state table.

Step 203: the forwarding chip updates a multicast forwarding table and a multicast state table according to a received multicast routing table, and determines that the multicast forwarding table is converged into a steady state according to the updated multicast state table.

In the step, the forwarding chip receives the multicast routing table transmitted by the multicast protocol driver, updates the SIP address field, and/or DIP address field, and/or inbound VLAN field and/or outbound interface field in the multicast forwarding table according to the multicast routing table, updates the state field in the multicast state table from a value representing that the multicast forwarding table is not converged into the steady state to a value representing that the multicast forwarding table is converged into the steady state, and updates the hit mark field in the multicast state table from a value representing that the multicast message is not successfully sent within the sending period to a value representing that the multicast message has been successfully sent within the sending period;

before the multicast forwarding table and the multicast state table are updated, the value of the Priority field in the multicast state table may also be traversed to determine whether to update the multicast state table within a current timer period or not. For example, if the value of the Priority filed in the multicast state table is an integer larger than or equal to 2, the multicast state table is not operated within a timer period of which the number is smaller than the value of the Priority filed, and the multicast state table is updated within a timer period of which the number is the value of the Priority filed.

The multicast state table is used to record a state of a multicast route in the multicast forwarding table, and the multicast state table and the multicast forwarding table share the same index value.

In addition, if the forwarding chip does not receive the multicast routing table within the timer period of which the number is the value of the Priority filed and the value of State in the multicast state table is detected to represent that the multicast forwarding table is not converged into the steady state at the end of the timer period of which the number is the value of the Priority filed, then the deleted CPU interface is added again to the outbound interface list of the multicast forwarding table to continue sending the known multicast message to the CPU for processing. Under a normal condition, the known multicast message may be timely processed after being sent, the multicast forwarding table may rapidly enter the steady state, and the multicast message may be timely successfully sent. However, if the CPU is busy and does not timely process the multicast message and thus causes packet loss, the forwarding chip may repeatedly send the known multicast message to the CPU within the next timer period until successful sending.

The step further includes that: when the forwarding chip receives the unknown multicast message, the forwarding chip updates the fields in the temporary multicast forwarding table and the fields in the temporary multicast state table according to the multicast routing table transmitted by a multicast protocol driver in the CPU, determines that the temporary multicast forwarding table is converged into the steady state according to the updated temporary multicast state table, and determines that the multicast sending process is implemented.

In addition, if the forwarding chip does not receive the multicast routing table within the timer period, wherein the amount of the timer period is the value of the Priority filed, and the value of State in the temporary multicast state table is detected to represent that the temporary multicast forwarding table is not converged into the steady state at the end of the timer period of which the number is the value of the Priority filed, then the temporary multicast forwarding table and the temporary multicast state table are deleted. For example, in a first preset timer period, the value of State in the temporary multicast state table is 1, the value of the Priority filed is 2 and the value of Hit is 0; and at the beginning of the next timer period, if the values of State and Hit are kept unchanged, then the forwarding chip simultaneously deletes the corresponding temporary multicast forwarding table and temporary multicast state table to ensure continuous sending of a subsequent unknown multicast message to the CPU.

In the embodiment, the multicast state table is added in the forwarding chip, the state of the multicast route in the multicast forwarding table is fed back through the multicast state table, and forwarding of multicast data streams is flexibly controlled through the state of the multicast route, so that the scenario that the same multicast message is repeatedly sent is avoided, the problem of all possible attacks of multicast sources to the CPU is effectively solved, the multicast message processing efficiency of the CPU is improved, and a resource utilization rate of the CPU is increased.

Embodiment 2

Figure 3:
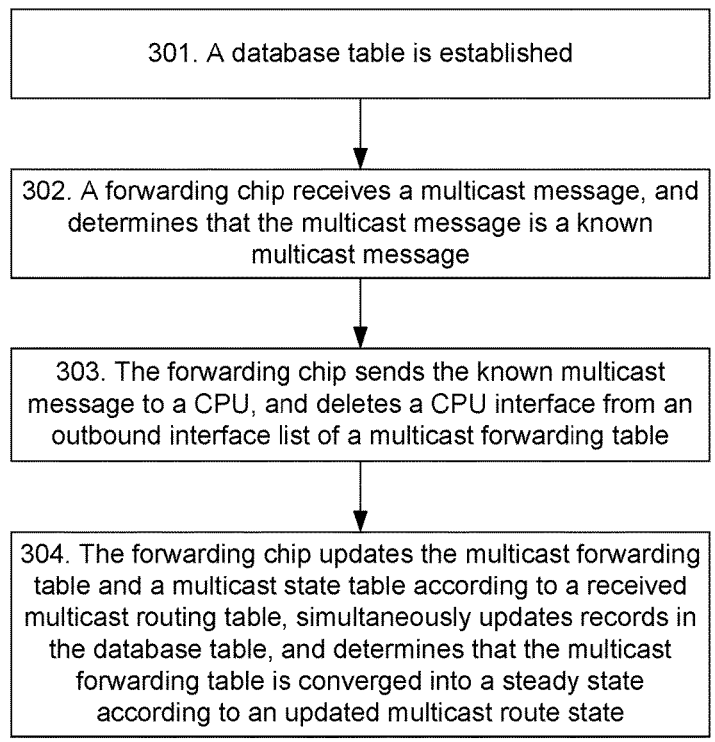
FIG. 3 is a flowchart of a multicast message forwarding method provided by embodiment 2 of the present disclosure.

Corresponding to embodiment 1, the present disclosure further provides a method for forwarding a multicast message, which aims to verify in a database whether a multicast state table can be got; and here, a record in the database is equivalent to a table entry in a forwarding chip, and a table entry in the forwarding chip is a combination of operations executed on a multicast forwarding table and the multicast state table by the forwarding chip. As shown in FIG. 3, the method mainly includes the following steps.

Step 301: a database table is established.

In the step, before the forwarding chip receives a multicast message, the database table mc_route is established when a multicast protocol driver is initiated, the database table mainly including: multicast information such as a multicast source (Source) address, a multicast group (Group) address, an inbound VLAN, an outbound interface list index value (Ipmc index), a multicast route state (route State), a multicast forwarding table priority (Priority) and a hit mark (Hit).

Step 302: the forwarding chip receives a multicast message, and determines that the multicast message is a known multicast message.

In the step, the forwarding chip checks whether the received multicast message has a multicast forwarding table or not according to information such as the multicast source address, the multicast group address and the inbound VLAN; when the multicast message has the multicast forwarding table, the multicast message is determined to be the known multicast message; and the step further includes that: when the multicast message has no multicast forwarding table, the multicast message is determined to be an unknown multicast message.

Step 303: the forwarding chip sends the known multicast message to a CPU, and deletes a CPU interface from an outbound interface list of the multicast forwarding table.

In the step, when the known multicast message is needed to be sent to the CPU for processing, the forwarding chip sends the known multicast message to the CPU according to the priority of the multicast forwarding table in the database table, deletes the CPU interface from the outbound interface list of the multicast forwarding table, writes a state field in the multicast state table to be a value representing that the multicast forwarding table is not converged into a steady state and writes a hit mark in the multicast state table to be a value representing that the multicast message is not successfully sent within a sending period. Here, corresponding records are simultaneously written into the database table, that is, the value representing that the multicast route state is not converged into the steady state and the value representing that the multicast message is not successfully sent within the sending period are written into the database table; and when the known multicast message is not needed to be sent to the CPU for processing, the forwarding chip normally forwards the known multicast message according to the multicast forwarding table.

Fields in the multicast state table include: information such as State, Priority of the multicast forwarding table and a Hit mark; specifically, the State includes two states, i.e. 0 and 1, where 0 represents that the multicast forwarding table is converged into the steady state, and 1 represents that the multicast forwarding table is not converged into the steady state;

similarly, the multicast route state in the database table corresponds to the State in the multicast state table, the multicast route state also includes two states, i.e. 0 and 1, where 0 represents that the multicast forwarding table is converged into the steady state, and 1 represents that the multicast forwarding table is not converged into the steady state;

the Priority is used to represent the priority of the multicast forwarding table; if the smaller the value of the Priority is, the higher the priority of the multicast forwarding table is; the Priority is further used to calculate the sending period of the multicast message, wherein sending period=timer period*Priority;

Hit has two states, i.e. 0 and 1, where 1 represents that the multicast message has been successfully sent within the sending period, and 0 represents that the multicast message is not successfully sent within the sending period; and in the present disclosure, a timer period is set according to a parameter, such as an aging period of the multicast forwarding table and a source registration message period, set in a multicast protocol, and the timer period is set to be 200 ms for a multicast service.

The step further includes that: when the multicast message received by the forwarding chip is the unknown multicast message, multicast information such as a SIP address, a DIP address and an inbound VLAN of the unknown multicast message is analyzed according to a multicast protocol analysis rule, the analyzed multicast information is written into a temporary multicast forwarding table, fields in a temporary multicast state table are written, and the unknown multicast message is sent to the CPU; and meanwhile, a corresponding record is written into the database table, that is, a corresponding multicast route state is written into the database table according to the field in the temporary multicast state table.

Here, the CPU may allocate an unknown multicast message data packet to a corresponding multicast protocol driver according to the multicast protocol PIMSM, and the multicast protocol driver analyzes the multicast information of the unknown multicast message according to the multicast protocol analysis rule, calculates a corresponding multicast route according to the analyzed multicast information and transmits a multicast routing table to the forwarding chip and the CPU, wherein the multicast protocol analysis rule includes: information such as the format of multicast data, the length of multicast data and the name of multicast data.

The fields in the temporary multicast forwarding table include: information such as the SIP address, DIP address and inbound VLAN of the multicast message and NULL; and NULL indicates that the outbound interface list of the multicast forwarding table is null, that is, the forwarding chip is not needed to forward the unknown multicast message to any port.

The fields in the temporary multicast state table match with the fields in the multicast state table.

Step 304: the forwarding chip updates a multicast forwarding table and a multicast state table according to a received multicast routing table, simultaneously updates records in the database table, and determines that the multicast forwarding table is converged into a steady state according to the updated multicast state table.

In the step, the forwarding chip receives the multicast routing table transmitted by the multicast protocol driver, updates the SIP address field, and/or DIP address field, and/or inbound VLAN field and/or outbound interface field in the multicast forwarding table according to the multicast routing table, updates the state field in the multicast state table from the value representing that the multicast forwarding table is not converged into the steady state to the value representing that the multicast forwarding table is converged into the steady state, and updates the hit mark field in the multicast state table from the value representing that the multicast message is not successfully sent within the sending period to the value representing that the multicast message has been successfully sent within the sending period;

here, at the same time when the forwarding chip updates the multicast forwarding table and the multicast state table, a record in the database table is also updated, the state of the multicast route and the Hit mark in the database table are updated according to the multicast routing table, a multicast route state field in the database table is updated from a value representing that the multicast forwarding table is not converged into the steady state to a value representing that the multicast forwarding table is converged into the steady state, and the hit mark field in the multicast state table is updated from the value representing that the multicast message is not successfully sent within the sending period to the value representing that the multicast message has been successfully sent within the sending period.

Before a record in the database table is updated, a value of a field Priority in the database table may also be traversed to determine whether to update the database table within a current timer period or not; and specifically, for example, if the value of the Priority filed in the database table is an integer larger than or equal to 2, the database table is not operated within a timer period of which the number is smaller than the value of the Priority filed, and updating operation is executed on the database table within a timer period of which the number is the value of the Priority filed.

In addition, if the forwarding chip does not receive the multicast routing table within the timer period of which the number is the value of the Priority filed and it is detected that the multicast route state is not converged into the steady state at the end of the timer period of which the number is the value of the Priority filed, then the deleted CPU interface is re-added to the outbound interface list of the multicast forwarding table to continue sending the known multicast message to the CPU for processing. Under a normal condition, the known multicast message may be timely processed after being sent, and the multicast forwarding table may rapidly enter the steady state; however, if the CPU is busy and does not timely process the multicast message and thus causes packet loss, the forwarding chip may repeatedly send the known multicast message to the CPU within the next timer period until successful sending.

The step further includes that: when the forwarding chip receives the unknown multicast message, the forwarding chip updates the fields in the temporary multicast forwarding table and the fields in the temporary multicast state table according to the multicast routing table transmitted by the multicast protocol driver in the CPU, simultaneously updates the corresponding records in the database table, determines that the temporary multicast forwarding table is converged into the steady state according to the updated temporary multicast state table, and determines that the multicast sending process is implemented; and in addition, if the forwarding chip does not receive the multicast routing table within the timer period of which the number is the value of the Priority filed and the value of State in the temporary multicast state table is detected to represent that the temporary multicast forwarding table is not converged into the steady state at the end of the timer period of which the number is the value of the Priority filed in the database table, then the temporary multicast forwarding table and the temporary multicast state table are deleted to ensure continuous sending of a subsequent unknown multicast message to the CPU.

The embodiment of the present disclosure is wide in application range, which is applicable to multicast message forwarding in Internet Protocol version 6 (IPv6) and Internet Protocol version 4 (IPv4), and is also applicable to multicast message forwarding in layer-2/3 switch equipment, routing equipment and various multicast service supporting communication equipment. According to the present disclosure, the CPU may be effectively protected from being attacked to effectively improve multicast message processing efficiency of the CPU on the basis of ensuring normal multicast stream forwarding.

Embodiment 3

Figure 4:
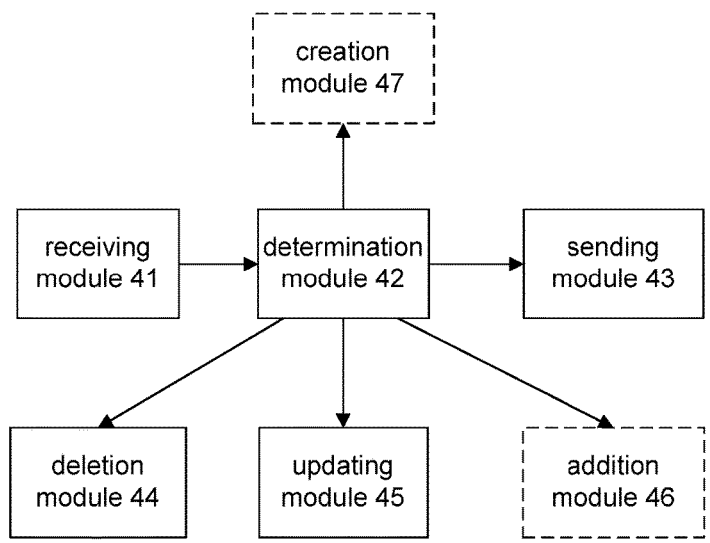
FIG. 4 is a structure diagram of a multicast message forwarding device provided by embodiment 3 of the present disclosure.

In order to implement the abovementioned method, the present disclosure further provides a multicast message forwarding device, which is usually integrated into a forwarding chip, and as shown in FIG. 4, the device includes: a receiving module 41, a determination module 42, a sending module 43, a deletion module 44 and an updating module 45, wherein the receiving module 41 may be implemented by a receiver of the forwarding chip, and is configured to receive a multicast message and a multicast routing table;

the determination module 42 may be implemented by a processor of the forwarding chip, and is configured to determine that the multicast message is a known multicast message and determine that a multicast forwarding table is converged into a steady state according to an updated multicast state table; specifically, the determination module 42 determines that the multicast message is the known multicast message when finding that the multicast message has the multicast forwarding table, and determines that the multicast message is an unknown multicast message when finding that the multicast message has no multicast forwarding table;

the sending module 43 may be implemented by a sender of the forwarding chip, and is configured to send the known multicast message to a CPU;

specifically, the sending module 43 sends the multicast message to the CPU according to priority of the multicast forwarding table in the multicast state table;

the deletion module 44 may be implemented by the processor of the forwarding chip, and is configured to delete a CPU interface from an outbound interface list of a multicast forwarding table; specifically, after the sending module 43 sends the known multicast message to the CPU, the deletion module 44 deletes the CPU interface from the outbound interface list of the multicast forwarding table;

the updating module 45 is located in the processor of the forwarding chip, and is configured to update the multicast forwarding table and the multicast state table according to the received multicast routing table; and specifically, the updating module 45 updates a SIP address field, and/or a DIP address field, and/or an inbound VLAN field and/or an outbound interface field in the multicast forwarding table according to the multicast routing table, updates a state field in the multicast state table from a value representing that the multicast forwarding table is not converged into the steady state to a value representing that the multicast forwarding table is converged into the steady state, and updates a hit mark field in the multicast state table from a value representing that the multicast message is not successfully sent within a sending period to a value representing that the multicast message has been successfully sent within the sending period, wherein the fields in the multicast forwarding table include: information such as a SIP address, DIP address and inbound VLAN of the multicast message; fields in the multicast state table include: information such as a state value State, Priority of a multicast forwarding table and a hit mark Hit; specifically, the State includes two states, i.e. 0 and 1, where 0 represents that the multicast forwarding table is converged into the steady state, and 1 represents that the multicast forwarding table is not converged into the steady state; the Priority is used to represent the priority of the multicast forwarding table, and if a value of the Priority is smaller, then the priority of the multicast forwarding table is higher; the Priority is further used to calculate the sending period of the multicast message, wherein sending period=timer period*Priority;

Hit has two states, i.e. 0 and 1, where 1 represents that the multicast message has been successfully sent within the sending period, and 0 represents that the multicast message is not successfully sent within the sending period; in the present disclosure, a timer period is set according to a parameter, such as an aging period of the multicast forwarding table and a source registration message period, set in a multicast protocol, and the timer period is set to be 200 ms for a multicast service; and the multicast state table is used to record a state of a multicast route in the multicast forwarding table, and the multicast state table and the multicast forwarding table share the same index value.

Before updating the multicast forwarding table and the multicast state table, the updating module 45 may be further configured to traverse the value of the field Priority in the multicast state table, not perform any operation on the multicast state table within a timer period of which the number is smaller than the value of the Priority filed, and update the multicast state table within a timer period of which the number is the value of the Priority filed.

The device further includes: an addition module 46, which may be implemented by the processor of the forwarding chip and is configured to re-add the deleted CPU interface to the outbound interface list of the multicast forwarding table when the value of the state field in the multicast state table is detected to represent that the multicast forwarding table is not converged into the steady state at the end of the timer period of which the number is the value of the Priority filed.

In addition, the device further includes: a creation module 47, which may be implemented by the processor of the forwarding chip and is configured to analyze multicast information of the unknown multicast message according to a multicast protocol analysis rule, write the analyzed multicast information into a temporary multicast forwarding table and write fields in the temporary multicast state table;

then, the sending module 43 is configured to send the unknown multicast message to the CPU;

correspondingly, the determination module 42 is configured to notify the creation module 47 when determining that the received multicast message is the unknown multicast message, and determine that the temporary multicast forwarding table is converged into the steady state according to the updated temporary multicast state table; and the updating module 45 is configured to update fields in the temporary multicast forwarding table and the fields in the temporary multicast state table according to the multicast routing table transmitted by each multicast protocol driver in the CPU.

Here, the temporary multicast state table also includes the multicast forwarding table priority field Priority; and the deletion module 44 is configured to delete the temporary multicast forwarding table and the temporary multicast state table when a value of a state field in the temporary multicast state table is detected to represent that the temporary multicast forwarding table is converged into the steady state at the end of the timer period of which the number is the value of the Priority filed.

The above are only the preferred embodiments of the present disclosure and not intended to limit the scope of protection of the present disclosure, and any modifications, equivalent replacements, improvements and the like made within the spirit and principle of the present disclosure shall fall within the scope of protection of the present disclosure.

INDUSTRIAL APPLICABILITY

According to embodiments of the present disclosure, the known multicast message is sent to a CPU, the CPU interface of the outbound interface list of a multicast forwarding table is deleted, the multicast forwarding table and the multicast state table are deleted according to the received multicast routing table, and it is determined that the multicast forwarding table is converged into the steady state according to the updated multicast state table, so that multicast message processing efficiency of the CPU may be more comprehensively improved on the premise of protecting the CPU, transmission routing efficiency of a multicast protocol layer may be further improved, and the multicast message may be timely forwarded.

What is claimed is:

1. A method for forwarding a multicast message, comprising:
   receiving, by a forwarding chip, a multicast message;
   determining, by the forwarding chip, that the multicast message is a known multicast message, and then sending the known multicast message to a Central Processing Unit (CPU), and deleting a CPU interface from an outbound interface list of a multicast forwarding table; and updating, by the forwarding chip, the multicast forwarding table and a multicast state table according to a received multicast routing table, and determining that the multicast forwarding table is converged into a steady state according to the updated multicast state table.

2. The forwarding method according to claim 1, wherein sending the known multicast message to the CPU comprises:
   sending the known multicast message to the CPU according to priority of the multicast forwarding table in the multicast state table.

3. The forwarding method according to claim 1, wherein updating the multicast forwarding table and the multicast state table according to the received multicast routing table comprises:
   updating a Source Internet Protocol (SIP) address field, and/or a Destination Internet Protocol (DIP) address field, and/or an inbound Virtual Local Area Network (VLAN) field and/or an outbound interface field in the multicast forwarding table according to the multicast routing table, updating a state field in the multicast state table from a value representing that the multicast forwarding table is not converged into the steady state to a value representing that the multicast forwarding table is converged into the steady state, and updating a hit mark field in the multicast state table from a value representing that the multicast message is not successfully sent within a sending period to a value representing that the multicast message has been successfully sent within the sending period.

4. The forwarding method according to claim 3, further comprising:
   before updating the multicast forwarding table and the multicast state table, traversing a value of a Priority field of the multicast forwarding table in the multicast state table, not performing any operation on the multicast state table within a timer period of which the number is smaller than the value of the Priority filed, and updating the multicast state table within a timer period of which the number is the value of the Priority field.

5. The forwarding method according to claim 4, further comprising:
   when the value of the state field in the multicast state table is detected to represent that the multicast forwarding table is not converged into the steady state at the end of the timer period of which the number is the value of the Priority filed, re-adding the deleted CPU interface to the outbound interface list of the multicast forwarding table.

6. The forwarding method according to claim 1, further comprising:
   when the multicast message received by the forwarding chip is an unknown multicast message, analyzing multicast information of the unknown multicast message according to a multicast protocol analysis rule, writing the analyzed multicast information into a temporary multicast forwarding table, writing fields in a temporary multicast state table and sending the unknown multicast message to the CPU.

7. The forwarding method according to claim 6, further comprising:
   updating, by the forwarding chip, fields in the temporary multicast forwarding table and the fields in the temporary multicast state table according to the multicast routing table transmitted by a multicast protocol driver in the CPU, and determining that the temporary multicast forwarding table is converged into the steady state according to the updated temporary multicast state table.

8. The forwarding method according to claim 7, further comprising:
the temporary multicast state table comprises a Priority field of the multicast forwarding table;
if the forwarding chip does not receive the multicast routing table within a timer period of which the number is a value of the Priority filed, then when a value of a state field in the temporary multicast state table is detected to represent that the temporary multicast forwarding table is converged into the steady state at the end of the timer period of which the number is the value of the Priority filed, the forwarding chip deletes the temporary multicast forwarding table and the temporary multicast state table.

9. A device for forwarding a multicast message, which is implemented by a forwarding chip, comprising: a receiving module, a determination module, a sending module, a deletion module and an updating module, wherein
the receiving module is configured to receive a multicast message and a multicast routing table;
the determination module is configured to determine that the multicast message is a known multicast message, and determine that a multicast forwarding table is converged into a steady state according to an updated multicast state table;
the sending module is configured to send the known multicast message to a Central Processing Unit (CPU);
the deletion module is configured to delete a CPU interface from an outbound interface list of the multicast forwarding table; and
the updating module is configured to update the multicast forwarding table and a multicast state table according to the received multicast routing table.

10. The forwarding device according to claim 9, wherein the sending module is configured to send the known multicast message to the CPU according to priority of the multicast forwarding table in the multicast state table.

11. The forwarding device according to claim 9, wherein the updating module is configured to update a Source Internet Protocol (SIP) address field, and/or a Destination Internet Protocol (DIP) address field, and/or an inbound Virtual Local Area Network (VLAN) field and/or an outbound interface field in the multicast forwarding table according to the multicast routing table, update a state field in the multicast state table from a value representing that the multicast forwarding table is not converged into the steady state to a value representing that the multicast forwarding table is converged into the steady state, and update a hit mark field in the multicast state table from a value representing that the multicast message is not successfully sent within a sending period to a value representing that the multicast message has been successfully sent within the sending period.

12. The forwarding device according to claim 11, wherein the updating module is further configured to, before updating the multicast forwarding table and the multicast state table, traverse a value of a Priority field of the multicast forwarding table in the multicast state table, not perform any operation on the multicast state table within a timer period of which the number is smaller than the value of the Priority filed, and update the multicast state table within a timer period of which the number is the value of the Priority filed.

13. The forwarding device according to claim 12, further comprising: an addition module configured to, when the value of the state field in the multicast state table is detected to represent that the multicast forwarding table is not converged into the steady state at the end of the timer period of which the number is the value of the Priority filed, re-add the deleted CPU interface to the outbound interface list of the multicast forwarding table.

14. The forwarding device according to claim 9, further comprising: a creation module configured to, when the multicast message received by the forwarding chip is an unknown multicast message, analyze multicast information of the unknown multicast message according to a multicast protocol analysis rule, write the analyzed multicast information into a temporary multicast forwarding table, and write fields in a temporary multicast state table, wherein
the sending module is further configured to send the unknown multicast message to the CPU;
the determination module is further configured to, when determining that the received multicast message is an unknown multicast message, notify the creation module, and determine that the temporary multicast forwarding table is converged into the steady state according to the updated temporary multicast state table; and
the updating module is further configured to update fields in the temporary multicast forwarding table and the fields in the temporary multicast state table according to the multicast routing table transmitted by a multicast protocol driver in the CPU.

15. The forwarding device according to claim 14, wherein the temporary multicast state table comprises a Priority field of the multicast forwarding table; and
the deletion module is further configured to, when a value of a state field in the temporary multicast state table is detected to represent that the temporary multicast forwarding table is converged into the steady state at the end of the timer period of which the number is the value of the Priority filed, delete the temporary multicast forwarding table and the temporary multicast state table.

* * * * *